US011542358B2

(12) United States Patent
Li et al.

(10) Patent No.: US 11,542,358 B2
(45) Date of Patent: Jan. 3, 2023

(54) CATALYST SYSTEM FOR POLYOL PREMIXES CONTAINING HYDROHALOOLEFIN BLOWING AGENTS

(71) Applicant: Huntsman Petrochemical LLC, The Woodlands, TX (US)

(72) Inventors: Cheng-Kuang Li, The Woodlands, TX (US); Charles E. Serrano, The Woodlands, TX (US); Dianne Trang Pham, The Woodlands, TX (US); Robert A. Grigsby, The Woodlands, TX (US)

(73) Assignee: Huntsman Petrochemical LLC, The Woodlands, TX (US)

( * ) Notice: Subject to any disclaimer, the term of this patent is extended or adjusted under 35 U.S.C. 154(b) by 136 days.

(21) Appl. No.: 16/640,417

(22) PCT Filed: Sep. 5, 2018

(86) PCT No.: PCT/US2018/049582
§ 371 (c)(1),
(2) Date: Feb. 20, 2020

(87) PCT Pub. No.: WO2019/050970
PCT Pub. Date: Mar. 14, 2019

(65) Prior Publication Data
US 2020/0247938 A1 Aug. 6, 2020

Related U.S. Application Data

(60) Provisional application No. 62/554,153, filed on Sep. 5, 2017.

(51) Int. Cl.

| | |
|---|---|
| *C08G 18/18* | (2006.01) |
| *C08G 18/20* | (2006.01) |
| *C08G 18/38* | (2006.01) |
| *C08G 18/40* | (2006.01) |
| *C08G 18/42* | (2006.01) |
| *C08G 18/50* | (2006.01) |
| *C08G 18/76* | (2006.01) |
| *C08J 9/00* | (2006.01) |
| *C08J 9/14* | (2006.01) |
| *C08K 5/02* | (2006.01) |

(52) U.S. Cl.
CPC ..... *C08G 18/1816* (2013.01); *C08G 18/2081* (2013.01); *C08G 18/4018* (2013.01); *C08K 5/02* (2013.01); *C08G 2110/0025* (2021.01)

(58) Field of Classification Search
CPC ........................ C08G 18/1816; C08G 18/2081
See application file for complete search history.

(56) References Cited

U.S. PATENT DOCUMENTS

| | | | |
|---|---|---|---|
| 4,371,629 A | 2/1983 | Austin | |
| 4,963,399 A * | 10/1990 | Gill | B32B 5/18 427/373 |
| 5,968,993 A * | 10/1999 | Bleys | C08G 18/4837 521/137 |
| 6,403,665 B1 * | 6/2002 | Sieker | C08G 18/6633 521/130 |
| 6,403,847 B1 | 6/2002 | Nakada et al. | |
| 6,844,475 B1 | 1/2005 | Tung et al. | |
| 7,189,884 B2 | 3/2007 | Mukhopadhyay et al. | |
| 7,230,146 B2 | 6/2007 | Merkel et al. | |
| 2006/0096694 A1 * | 5/2006 | Zhou | C08G 18/4072 252/511 |
| 2009/0099274 A1 * | 4/2009 | Van der Puy | C08G 18/1808 521/110 |
| 2012/0220677 A1 | 8/2012 | Williams et al. | |
| 2014/0005288 A1 | 1/2014 | Chen et al. | |
| 2014/0051776 A1 | 2/2014 | Chen et al. | |
| 2014/0171527 A1 * | 6/2014 | Yu | C08J 9/02 521/121 |
| 2014/0371338 A1 * | 12/2014 | Chen | C08G 18/7664 521/137 |
| 2015/0197614 A1 | 7/2015 | Chen et al. | |
| 2016/0145374 A1 | 5/2016 | Ishikawa | |
| 2016/0376397 A1 | 12/2016 | Dedecker et al. | |
| 2018/0105633 A1 * | 4/2018 | Van der Puy | C08G 18/1875 |
| 2019/0375878 A1 * | 12/2019 | Singh | C08G 18/7664 |

FOREIGN PATENT DOCUMENTS

| | | | |
|---|---|---|---|
| AU | 2015255236 A1 * | 11/2015 | |
| EP | 0902039 B1 * | 3/2004 | |
| WO | 93/25598 A1 | 12/1993 | |
| WO | 2014133986 A1 | 9/2014 | |
| WO | 2014134087 A1 | 9/2014 | |
| WO | 2016/162362 A1 | 10/2016 | |
| WO | 2016201293 A1 | 12/2016 | |

OTHER PUBLICATIONS

Supplementary EP Search Report received in corresponding application No. EP18854067, completed Apr. 1, 2021.
International Search Report and Written Opinion received in corresponding PCT Application No. PCT/US18/049582, completed Nov. 4, 2018 and dated Nov. 30, 2018.

* cited by examiner

*Primary Examiner* — Melissa A Rioja
(74) *Attorney, Agent, or Firm* — Huntsman Petrochemical LLC

(57) ABSTRACT

A catalyst system useful in the production of polyurethane and/or polyisocyanurate foams using hydrohaloolefin blowing agents.

9 Claims, No Drawings

CATALYST SYSTEM FOR POLYOL PREMIXES CONTAINING HYDROHALOOLEFIN BLOWING AGENTS

CROSS REFERENCE TO RELATED APPLICATIONS

This application claims the benefit of U.S. Provisional Patent Application Ser. No. 62/554,153, filed Sep. 5, 2017, the entire contents of which are expressly incorporated herein by reference.

STATEMENT REGARDING FEDERALLY SPONSORED RESEARCH OR DEVELOPMENT

Not applicable.

FIELD

The present disclosure generally relates to a catalyst system useful in the production of polyurethane and/or polyisocyanurate foams using hydrohaloolefin blowing agents. In particular, the present disclosure relates to a polyol premix composition comprising the catalyst system, a polyol, and a hydrohaloolefin blowing agent. The presently disclosed polyol premix may be used to produce a polyurethane and/or polyisocyanurate foam by combining the polyol premix with an isocyanate.

BACKGROUND

Polyurethane and polyisocyanurate foams have utility in numerous insulation applications including roofing systems, building panels, building envelope insulation, spray applied foams, one and two component froth foams, insulation for refrigerators and freezers, and so called integral skin used to produce, e.g., automotive or aerospace cabin parts.

It is known in the art that rigid or semi-rigid polyurethane and polyisocyanurate foams are produced by reacting a polyisocyanate with one or more polyols in the presence of a blowing agent, catalyst, and, optionally, other ingredients. Typically, the components for such polyurethane or polyisocyanurate foams are in pre-blended formulations referred to as an "A side" and a "B side". The A side comprises one or more polyisocyanates and, optionally, one or more isocyanate-compatible ingredients. The "B side" generally comprises: (i) one or more polyols, (ii) one or more catalysts, (iii) one or more blowing agent, and, optionally, (iv) one or more auxiliary components such as, for example, surfactants, flame retardants, colorants, compatibilizers, and solubilizers. The B side is also often referred to as a "polyol premix".

Polyurethane and polyisocyanurate foams are prepared by bringing the A and B sides together by either hand mixing (for small preparations) and/or using machine mixing techniques to form, e.g., blocks, slabs, laminates, spray applied foams, froths, and pour-in-place panels and other items. Optional ingredients such as fire retardants, colorants, auxiliary blowing agents, and other polyols can be added when mixing rather than being premixed into the A side or B side.

Historically, liquid blowing agents such as chlorofluorocarbons (CFCs) and hydrofluorocarbons (HFCs) have been used to make polyurethane and polyisocyanurate foams due to their ease of use and ability to produce foams with beneficial mechanical and thermal insulation properties. However, due to a concern that CFCs and HFCs are bad for the environment, a new generation of halogenated hydroolefinic blowing agents (also referred to as "hydrohaloolefins") have been developed to replace CFCs and HFCs. Without intending to be bound to a specific theory, it is generally thought that such hydrohaloolefins have an inherent chemical instability in the lower atmosphere resulting in a low global warming potential (GWP) and zero or near zero ozone depletion potential (ODP), thereby rendering hydrohaloolefins better for the environment than CFCs and HFCs.

Among the category of hydrohaloolefin blowing agents are certain hydrofluoroolefins (HFOs) of particular interest, including, for example, trans-1,3,3,3-tetrafluoropropene (1234ze(E)) and 1,1,1,4,4,4-hexafluorobut-2-ene (1336mzzm(Z)). Also among the category of hydrohaloolefin blowing agents are certain hydrochlorofluoroolefins (HCFOs) of particular interest, which include, for example, 1-chloro-3,3,3-trifluoropropene (1233zd) (including both cis and trans isomers and combinations thereof). Processes for the manufacture of trans-1,3,3,3-tetrafluoropropene are disclosed in U.S. Pat. Nos. 7,230,146 and 7,189,884, which are hereby incorporated by reference in their entirety (to the extent that they do not contradict the instant disclosure). Processes for the manufacture of trans-1-chloro-3,3,3-trifluoropropene are disclosed in U.S. Pat. Nos. 6,844,475 and 6,403,847, which are hereby incorporated by reference in their entirety (to the extent that they do not contradict the instant disclosure).

The use of HFOs and HFCOs in polyol premixes for polyurethane and polyisocyanurate foams has been described in numerous applications such as U.S. Patent Publication Nos. 2012/0220677, 2015/0197614, and 2016/0376397, which are hereby incorporated by reference in their entirety (to the extent that they do not contradict the instant disclosure). However, it has been found that when polyol premixes (i.e., B sides) containing a hydrohaloolefin blowing agent and a typical amine catalyst are aged prior to mixing and reacting with a polyisocyanate (i.e., an A side), deleterious effects can occur. For instance, it has been found that such formulations, when aged, can produce a foamable composition which has an undesirable increase in reactivity time (i.e., a delay in reaction completion) and/or undesirable properties.

In order to avoid such deleterious effects, it was previously discovered that certain combinations of amine catalysts, solvents, and/or other components like, e.g., tetraalkylguanidine as disclosed in US Pat. Pub. No. 2012/0220677, could help stabilize hydrohaloolelfin blowing agents in the presence of amine catalysts. It has been recently found, however, that when polyol premixes containing such stabilizing combinations are contacted with an isocyanate, the components in such combinations can negatively impact the front end reactivity of the catalysts contained therein.

Therefore, it would be advantageous to provide a catalyst system that is capable of adequately stabilizing the catalysts used in a polyol premix that contains hydrohaloolefin blowing agents, yet allow the catalysts in the polyol premix to have improved front end reactivity over comparable catalysts/polyol premixes used to make, for example, polyurethane and/or polyisocyanurate foams.

DETAILED DESCRIPTION

Before explaining at least one embodiment of the present disclosure in detail, it is to be understood that the present disclosure is not limited in its application to the details of construction and the arrangement of components or steps or methodologies set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference to the extent that they do not contradict the instant disclosure.

All of the compositions and/or methods disclosed herein can be made and executed without undue experimentation in light of the present disclosure. While the compositions and methods of the present disclosure have been described in terms of preferred embodiments, it will be apparent to those having ordinary skill in the art that variations may be applied to the compositions and/or methods and in the steps or sequences of steps of the methods described herein without departing from the concept, spirit, and scope of the present disclosure. All such similar substitutes and modifications apparent to those skilled in the art are deemed to be within the spirit, scope, and concept of the present disclosure.

As utilized in accordance with the present disclosure, the following terms, unless otherwise indicated, shall be understood to have the following meanings.

The use of the word "a" or "an", when used in conjunction with the term "comprising", "including", "having", or "containing" (or variations of such terms) may mean "one", but it is also consistent with the meaning of "one or more", "at least one", and "one or more than one".

The use of the term "or" is used to mean "and/or" unless clearly indicated to refer solely to alternatives and only if the alternatives are mutually exclusive.

Throughout this disclosure, the term "about" is used to indicate that a value includes the inherent variation of error for the quantifying device, mechanism, or method, or the inherent variation that exists among the subject(s) to be measured. For example, but not by way of limitation, when the term "about" is used, the designated value to which it refers may vary by plus or minus ten percent, or nine percent, or eight percent, or seven percent, or six percent, or five percent, or four percent, or three percent, or two percent, or one percent, or one or more fractions therebetween.

The use of "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it refers. In addition, the quantities of 100/1000 are not to be considered as limiting since lower or higher limits may also produce satisfactory results.

In addition, the phrase "at least one of X, Y, and Z" will be understood to include X alone, Y alone, and Z alone, as well as any combination of X, Y, and Z. Likewise, the phrase "at least one of X and Y" will be understood to include X alone, Y alone, as well as any combination of X and Y.

Additionally, it is to be understood that the phrase "at least one of" can be used with any number of components and have the similar meanings as set forth above.

The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The phrases "or combinations thereof" and "and combinations thereof" as used herein refers to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms such as BB, AAA, CC, AABB, AACC, ABCCCC, CBBAAA, CABBB, and so forth. The skilled artisan will understand that typically there is no limit on the number of items or terms in any combination, unless otherwise apparent from the context. In the same light, the term "and combinations thereof" when used with the phrase "selected from the group consisting of" refers to all permutations and combinations of the listed items preceding the phrase.

The phrases "in one embodiment", "in an embodiment", "according to one embodiment", and the like generally mean the particular feature, structure, or characteristic following the phrase is included in at least one embodiment of the present disclosure, and may be included in more than one embodiment of the present disclosure. Importantly, such phrases are non-limiting and do not necessarily refer to the same embodiment but, of course, can refer to one or more preceding and/or succeeding embodiments. For example, in the appended claims, any of the claimed embodiments can be used in any combination.

As used herein, the terms "% by weight", "wt %", "weight percentage", or "percentage by weight" are used interchangeably.

The phrase "substantially free" shall be used herein to mean present in an amount less than 1 weight percent, or less than 0.1 weight percent, or less than 0.01 weight percent, or alternatively less than 0.001 weight percent, based on the total weight of the referenced composition.

As used herein, the term "ambient temperature" refers to the temperature of the surrounding work environment (e.g., the temperature of the area, building or room where the curable composition is used), exclusive of any temperature changes that occur as a result of the direct application of heat to the curable composition to facilitate curing. The ambient temperature is typically between about 10° C. and about 30° C., more specifically about 15° C. and about 25° C.

The phrase "front-end reactivity" is defined as the start of the reaction process to produce a polyurethane or polyisocyanurate foam. In particular, spray foam formulations need a very fast front-end reactivity on the reaction profile such that the foam does not sag or run when it is sprayed. It must set up quickly to prevent the foam from running down a sprayed surface or drip down from a sprayed ceiling. The "front-end reactivity" can be assessed by measuring the cream time and top of cup time of the polyurethane or polyisocyanurate foam after mixing a polyol premix and isocyanate.

It was unexpectedly found that a catalyst system comprising 2,2'-dimorpholinodiethyl ether, N,N-dimethylcyclohexylamine, and a hydroxyl-containing compound selected from a diol (e.g., ethylene glycol) and/or an alkanolamine (e.g., methyldiethanolamine) is capable of stabilizing a polyol premix containing a hydrohaloolefin blowing agent while improving the front-end reactivity of the polyol premix over comparable catalysts/polyol premixes when contacted with an isocyanate.

According to one aspect, the present disclosure is directed to a catalyst system comprising 2,2'-dimorpholinodiethyl ether, N,N-dimethylcyclohexylamine, and a hydroxyl-containing compound selected from a diol, an alkanolamine, and combinations thereof.

Non-limiting examples of the diol include ethylene glycol; diethylene glycol; propylene glycols such as, for example, 2,2-dipropyleneglycol, 1,2-dipropylene glycol, and 1,3-dipropylene glycol; butane glycols such as, for example, 1,4-butandiol, 1,3-butandiol, and 1,2-butandiol; 1,4-cyclohexanedimethanol, 1-ethyl-; and combinations thereof.

In one embodiment, the diol is ethylene glycol.

Non-limiting examples of the alkanolamine include methyldiethanolamine, ethyldiethanolamine, isopropyldiethanol amine, fatty alcohol-based amine ethoxylates such as, for example but without limitation, tallow amine ethoxylate, and derivatives and/or combinations thereof.

In one embodiment, the alkanolamine is methyldiethanolamine.

In one embodiment, the hydroxyl-containing compound is a mixture of a diol and an alkanolamine, wherein the weight ratio of the diol to alkanolamine is in a range of from 10:1 to 1:10, or from 9:1 to 1:9, or from 8:1 to 1:8, or from 7:1 to 1:7, or from 6:1 to 1:6, or from 5:1 to 1:5, or from 4:1 to 1:4, or from 3:1 to 1:3, or from 1:2 to 2:1, or about 1:1.

In one particular embodiment, the hydroxyl-containing compound is a mixture of ethylene glycol and methyldiethanolamine.

The hydroxyl-containing compound is present in the catalyst system in an amount ranging from about 1 to about 25 wt %, or from about 2 to about 20 wt %, or from about 5 to about 15 wt % based on the weight of the catalyst system.

In one embodiment, the weight ratio of 2,2'-dimorpholinodiethyl ether (JEFFCAT® DMDEE catalyst) and N,N-dimethylcyclohexylamine (JEFFCAT® DMCHA catalyst) can range from 10:1 to 1:10, or 5:1 to 1:5, or 3.5:1 to 1:3.5, or 3.5:1 to 1:1 of 2,2'-dimorpholinodiethyl ether to N,N-dimethylcyclohexylamine. The aforementioned JEFFCAT® catalysts are available from Huntsman Petrochemical LLC or an Affiliate thereof (The Woodlands, Tex.).

In an alternative aspect, the present disclosure is directed to a catalyst system comprising 2,2'-dimorpholinodiethyl ether, N-(3-dimethylaminopropyl)-N,N-diisopropanolamine, and, optionally, N,N-dimethylcyclohexylamine. The catalyst system can further comprise a hydroxyl-containing compound selected from a diol (e.g., ethylene glycol) and/or an alkanolamine (e.g., methyldiethanolamine).

In one embodiment, the catalyst system further comprises one or more additional catalysts. Non-limiting examples of such catalysts include N,N-dimethylethanolamine (JEFFCAT® DMEA catalyst), bis-(2-dimethylaminoethyl)ether (JEFFCAT® ZF-20 catalyst), triethylene diamine (JEFFCAT® TEDA catalyst), blends of N,N-dimethylethanolamine aniethylene diamine (such as JEFFCAT® TD-20 catalyst), N,N,N'-trimethyl-N'-hydroxyethylbisaminoethylether (JEFFCAT® ZF-10 catalyst), pentamethyldiethylenetriamine (JEFFCAT® PMDETA catalyst), N,N,N',N',N''-pentamethyldiethylenetriamine (JEFFCAT® ZR-40 catalysts), 1,4-diazadicyclo[2,2,2]octane (DABCO), 2-(2-dimethylaminoethoxy)-ethanol (DMAFE), 2-((2-dimethylaminoethoxy)-ethyl methyl-amino)ethanol, 1-(bis(3-dimethylamino)-propyl)amino-2-propanol, N, N',N''-tris(3-dimethylamino-propyl)hexahydrotriazine, benzyldimethylamine (JEFFCAT® BDMA catalyst), N-(3-dimethylaminopropyl)-N,N-diisopropanolamine (JEFFCAT® DPA catalyst), N,N,N',N',N''-pentamethyldipropylenetriamine, N, N'-diethylpiperazine, N, N'-dimethylpiperzine (JEFFCAT® DMP catalyst), and 1,4-di-(1-pyrrolidinyl)butane ("BDO$_3$"). In particular, sterically hindered primary, secondary or tertiary amines are useful, for example, dicyclohexylmethylamine, ethyldiisopropylamine, dimethylcyclohexylamine, dimethylisopropylamine, methylisopropylbenzylamine, methylcyclopentylbenzylamine, isopropyl-sec-butyl-trifluoroethylamine, diethyl-α-phenyethyl)amine, tri-n-propylamine, dicyclohexylamine, t-butylisopropylamine, di-t-butylamine, cyclohexyl-t-butylamine, de-sec-butylamine, dicyclopentylamine, di-α-trifluoromethylethyl) amine, di-(α-phenylethyl)amine, triphenylmethylamine, and 1,1-diethyl-n-propylamine. Other sterically hindered amines include morpholines, imidazoles, ether containing compounds such as dimorpholinodiethylether, N-ethylmorpholine (JEFFCAT® NEM catalyst), N-methylmorpholine (JEFFCAT® NMM catalyst), 4-methoxyethylmorpholine, bis(dimethylaminoethyl)ether, imidazole, n-methylimidazole, 1,2-dimethylimidazole, dimorpholinodimethylether, N, N, N',N', N'',N''-pentamethyldiethylenetriamine, N, N, N',N', N'',N''-pentaethyldiethylenetriamine, N,N,N',N',N'', N''-pentamethyl-dipropylenetriamine, bis(diethylaminoethyl)ether, bis(dimethylaminopropyl)ether, guanidines including pentamethyl guanidine and cyclic guanidines, guanidine derivatives/salts including cyanoguanidine, guanidine hydrochloride salt, guanidine phosphate salts, guanidine sulfate salts, 1-acetylguanidine, nitroguanidine, 1-(o-tolyl)biguanidine, and mixtures thereof, as well as tetraalkyl guanidines that have a formula as in the following:

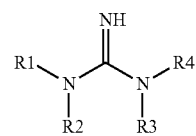

where R1, R2, R3, and R4 are independently C1-C10 alkyl groups; exemplary tetraalkyl guanidines include tetramethyl guanidine, PolyCat® 201, 204 (Evonik Industries AG) and the like; and combinations thereof. The aforementioned JEFFCAT® catalysts are available from Huntsman Petrochemical LLC or an Affiliate thereof (The Woodlands, Tex.).

In yet another embodiment, the catalyst system further comprises a pyrrolidine-based catalyst or derivative thereof. In one embodiment, the pyrrolidine-based catalyst is a compound of the formula (I):

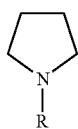

(I)

where R is selected from the group consisting of: $(CH_2)_n-R^3$, $(CH_2)_n-OR^3$, $(CH_2)_n-NR^3COR^4$, $(CH_2)_n-NR^3SO_2R^4$, $(CH_2)_n-COOR^3$, $(CH_2)_n-COR^3$, $(CH_2)_n-SR^3$, $(CH_2)_n-SOR^3$, $(CH_2)_n-SO_2R^3$, $(CH_2)_n-SO_3H$, $(CH_2)_n-SONR^3R^4$ and $(CH_2)_n-SO_2NR^3R^4$;

$R^3$ and $R^4$ are independently selected from:

H;

lower alkyl optionally substituted with halogen, hydroxy, lower alkoxy, N(lower alkyl)$_2$, NCO, oxo, carboxy, carboxy lower alkyl, cycloalkyl and heteroaryl;

lower cycloalkyl optionally substituted with halogen, lower alkoxy, lower alkyl, carboxy, carboxy lower alkoxy, carboxy lower alkyl, oxo, CN, NCO and NHSO$_2$-lower alkyl;

lower alkenyl optionally substituted with halogen, hydroxy, NH$_2$, NH-lower alkyl, NCO and N-(lower alkyl)$_2$;

lower alkynyl optionally substituted with halogen, hydroxy, NH$_2$, NH-lower alkyl, NCO and N-(lower alkyl)$_2$;

lower cycloalkenyl optionally substituted with halogen, lower alkoxy, lower alkyl, carboxy, carboxy lower alkoxy, oxo, NCO and CN;

aryl optionally substituted with halogen, lower alkoxy, hydroxy, lower alkyl, lower alkenyl, cycloalkyl, carboxy, carboxy lower alkoxy, carboxy lower alkyl, oxo, CN and CONR$^5$R$^6$, wherein R$^5$ and R$^6$ are each an alkyl or aryl group, heteroaryl optionally substituted with halogen, lower alkoxy, lower alkyl, carbonyl, carboxy, carboxy lower alkyl, carboxy lower alkoxy, oxo and CN;

heterocycle optionally substituted with halogen, lower alkyl, lower alkoxy, carboxy, carboxy lower alkoxy, oxo, NCO, CN, SO$_2$-lower alkyl, and lower alkyl that is substituted with oxo; and a pyrrolidine ring (i.e., $C_4H_8N^-$); and n is an integer from 1 to 6

In one embodiment, the catalyst system can be partially acid blocked using a sufficient amount of an organic acid. Such a partially acid blocked catalyst system reduces the activity of some of the catalyst system until a sufficiently high temperature is reached at which point reactivity of the catalyst is no longer reduced or such reduction is lessened.

In one non-limiting embodiment, the catalyst system is substantially free of tetraalkyl guanidines and derivatives thereof, imidazole and imidazole derivatives, and/or metal catalysts.

According to another aspect, the present disclosure is directed to a polyol premix comprising (i) at least one hydrohaloolefin blowing agent, (ii) a polyol, and (iii) the above-described catalyst system comprising 2,2'-dimorpholinodiethyl ether, N,N-dimethylcyclohexylamine, and a hydroxyl-containing compound selected from a diol, an alkanolamine, and a combination thereof.

In another aspect, the present disclosure is directed to a polyol premix comprising (i) at least one hydrohaloolefin blowing agent, (ii) a polyol, and (iii) a catalyst system comprising 2,2'-dimorpholinodiethyl ether, N-(3-dimethylaminopropyl)-N, N-diisopropanolamine, and, optionally, N,N-dimethylcyclohexylamine.

In one embodiment, the at least one hydrohaloolefin blowing agent is a hydrofluoroolefin, hydrochlorofluoroolefin, or a combination thereof.

Non-limiting examples of the at least one hydrohaloolefin blowing agent include hydrofluoroolefin (HFO) blowing agents containing 3, 4, 5, or 6 carbons, and further include, for example but without limitation, pentafluoropropenes; tetrafluoropropenes such as 1,3,3,3-tetrafluoropropene (HFO 1234ze, E and Z isomers), 2,3,3,3-tetrafluoropropene (HFO 1234yf), 1,2,3,3-tetrafluoropropene (HFO 1234ye); trifluoropropenes such as 3,3,3-trifluoropropene (1243zf); tetrafluorobutenes such as HFO 1345; pentafluorobutene isomers such as HFO1354; hexafluorobutene isomers such as HFO 1336 (e.g. z-1336mzz); heptafluorobutene isomers such as HFO 1327; heptafluoropentene isomers such as HF01447; octafluoropentene isomers such as HFO 1438; nonafluoropentene isomers such as HFO 1429; hydrochlorofluoroolefin (HCFO) blowing agents such as 1-chloro-3,3,3-trifluoropropene (HCFO-1233zd), 2-chloro-3,3,3-trifluoropropene (HCFO 1233xf), HCFO 1223, 1,2-dichloro-1,2-difluoroethene (E and Z isomers), 3,3-dichloro-3-fluoropropene, 2-chloro-1,1,1,4,4,4-hexafluorobutene-2 (E and Z isomers), and 2-chloro-1,1,1,3,4,4,4-heptafluorobutene-2 (E and Z isomers).

The at least one hydrohaloolefin blowing agent in the polyol premix can be used alone or in combination with other blowing agents including, but not limited to: (a) hydrofluorocarbons including, for example, difluoromethane (HFC-32); 1,1,1,2,2-pentafluoroethane (HFC-125); 1,1,1-trifluoroethane (HFC143a); 1,1,2,2-tetrafluorothane (HFC-134); 1,1,1,2-tetrafluoroethane (HFC-134a); 1,1-difluoroethane (HFC-152a); 1,1,1,2,3,3,3-heptafluoropropane (HFC-227ea); 1,1,1,3,3-pentafluopropane (HFC-245fa); 1,1,1,3,3-pentafluobutane (HFC-365mfc) and 1,1,1,2,2,3,4,5,5,5-decafluoropentane (HFC-4310mee); (b) hydrocarbons including, for example, pentane isomers (iso-pentane, n-pentane, cyclo-pentane) and butane isomers; (c) hydrofluoroethers (HFE), including, for example, $C_4F_9OCH_3$ (HFE-7100), $C_4F_9OC_2H_5$(HFE-7200), $CF_3CF_2OCH_3$ (HFE-245cb2), $CF_3CH_2CHF_2$ (HFE-245fa), $CF_3CH_2OCF_3$ (HFE-236fa), $C_3F_7OCH_3$ (HFE-7000), 2-trifluoromethyl-3-ethoxydodecofluorohexane (HFE-7500), 1,1,1,2,3-hexafluoro-4-(1,1,2,3,3,3-hexafluoropropoxy)-pentane (HFE-7600), 1,1,1,2,2,3,5,5,5-decafluoro-3-methoxy-4-(trifluoromethyl)pentane (HFE-7300), ethyl nonafluoroisobutyl ether/ethyl nonafluorobutyl ether (HFE-8200), $CHF_2OCHF_2$, $CHF_2OCH_2F$, $CH_2FOCH_2F$, $CH_2FOCH_3$, cyclo-$CF_2CH_2CF_2O$, cyclo-$CF_2CF_2CH_2O$, $CHF_2CF_2CHF_2$, $CF_3CF_2OCH_2F$, $CHF_2OCHFCF_3$, $CHF_2OCF_2CHF_2$, $CH_2FOCF_2CHF_2$, $CF_3OCF_2CH_3$, $CHF_2CHFOCHF_2$, $CF_3OCHFCH_2F$, $CF_3CHFOCH_2F$, $CF_3OCH_2CHF_2$, $CHF_2OCH_2CF_3$, $CH_2FCF_2OCH_2F$, $CHF_2OCF_2CH_3$, $CHF_2CF_2OCH_3$ (HFE254 pc), $CH_2FOCHFCH_2F$, $CHF_2CHFOCH_2F$, $CF_3OCHFCH_3$, $CF_3CHFOCH_3$, $CHF_2OCH_2CHF_2$, $CF_3OCH_2CH_2F$, $CF_3CH_2OCH_2F$, $CF_2HCF_2CF_2OCH_3$, $CF_3CHFCF_2OCH_3$, $CHF_2CF_2CF_2OCH_3$, $CHF_2CF_2CH_2OCHF_2$, $CF_3CF_2CH_2OCH_3$, $CHF_2CF_2OCH_2CH_3$, $(CF_3)_2CFOCH_3$, $(CF_3)_2CHOCHF_2$, $(CF_3)_2CHOCH_3$, and mixture thereof; (d) C1 to C5 alcohols, C1 to C4 aldehydes, C1 to C4 ketones, C1 to C4 ethers and diethers, C1 to C6 hydrocarbons, e.g. iso-, normal, cyclopentane; (e) water, (f) carbon dioxide; (g) trans-1,2-dichloroethylene; and (h) methylformate, methylacetate, ethyl formate, and dimethoxymethane.

In one particular embodiment, the at least one hydrohaloolefin blowing agent is selected from trans-1-chloro-3,3, 3-tetrafluoropropene (HFCO 1233zd), trans-1,3,3,3-tetrafluoropropene (HFO 1234ze), or a combination thereof.

The at least one hydrohaloolefin blowing agent is present in the polyol premix in an amount ranging from about 1 to about 35 wt %, or from about 2 to about 30 wt %, or from about 3 to about 25 wt %, or from about 4 to about 20 wt %, or from about 5 to about 15 wt %, or from about 7 to about 15 wt % based on the weight of the polyol premix.

The polyol can be one or more polyols which react in a known fashion with an isocyanate in the preparation of a polyurethane and/or polyisocyanurate foam. In one embodiment, the polyol component includes polyols typically used for making rigid PIR/PUR (polyisocyanurate and/or polyurethane) foam.

In one embodiment, the polyol comprises one or more polyether polyols. Non-limiting examples of the polyether polyols include poly(alkylene oxide) polymers, such as, poly(ethylene oxide), poly(propylene oxide), and/or compolymers with terminal hydroxyl groups derived from polyhydric compounds (for example, diols, triols, tetraols, pentaols, and the like); polyhydroxy-terminated acetal resin; hydroxy-terminated amine; hydroxyl-terminated polyamine; or combinations thereof.

In another embodiment, the polyol component includes amine polyether polyols that can be prepared when an amine, such as ethylenediamine, diethylenetriamine, tolylenediamine, diphenylmethanediamine, triethanolamine, or the like, is reacted with ethylene oxide or propylene oxide.

In yet another embodiment, the polyol component includes a polyester polyol produced when a dicarboxylic acid is reacted with an excess of a diol, for example, terephthalic acid, adipic acid, phathalic acid, phthalic anhydride with ethylene glycol, diethylene glycol, polyethylene glycol, propylene glycol, dipropylene glycol, polypropylene glycol or butanediol, or when a lactone is reacted with an excess of a diol, such as, caprolactone with propylene glycol.

In another embodiment, the polyol is, or includes, polyalkylene carbonate-based polyols, phosphate-based polyols, or combinations thereof.

In still another embodiment, the polyol is or includes a natural oil polyol. The natural oil polyol includes triglycerides of saturated and/or unsaturated acids having a carbon chain length between 12 and 24. The saturated acids are lauric acid, myristic acid, palmitic acid, steric acid, arachidic acid, lignoceric acid, or a combination thereof. The unsaturated acids are mono-unsaturated (for example, palmitoleic acid, oleic acid, or a combination thereof) and/or poly-unsaturated (for example, linoleic acid, linolenic acid, arachidonic acid, or a combination thereof).

The polyol is present in the polyol premix in an amount ranging from about 20 to about 95 wt %, or from about 25 to about 95 wt %, or from about 30 to about 95 wt %, or from about 35 to about 95 wt %, or from about 40 to about 95 wt %, or from about 45 to about 95 wt %, or from about 50 to about 90 wt %, or from about 60 to about 90 wt %, or from about 70 to about 90 wt % based on the weight of the polyol premix.

In one non-limiting embodiment, the polyol premix is substantially free of tetraalkyl guanidines and derivatives thereof, imidazole and imidazole derivatives, and/or metal catalysts.

The amount of the catalyst system present in the polyol premix can range from about 0.1 to about 20 wt %, or from about 0.1 to about 15 wt %, or from about 0.2 to about 15 wt %, or from about 0.3 to about 10 wt %, or from about 0.5 to about 7 wt % based on the weight of the polyol premix.

In one embodiment, the polyol premix can further comprise additional component such as, for example but without limitation, fire retardants, dyes, fillers, pigments, dispersing agents, and cell stabilizers.

According to another aspect, the present disclosure is directed to a method of forming the above-described polyol premix comprising combining the at least one hydrohaloolefin blowing agent, the polyol, and the catalyst system.

In yet another aspect, the present disclosure is directed to a method of forming a polyurethane or polyisocyanurate foam, comprising contacting one of the above-described polyol premixes with at least one isocyanate.

Any polyisocyanate can be employed as the at least one isocyanate, inclusive of aliphatic and aromatic polyisocyanates. Suitable organic polyisocyanates include aliphatic, cycloaliphatic, araliphatic, aromatic, and heterocyclic isocyanates which are well known in the field of polyurethane chemistry.

Non-limiting examples of the polyisocyanates that can be used as the at least one isocyanate include those represented by the formula $Q(NCO)_a$ where a is a number from 2-5, preferably 2-3 and Q is an aliphatic hydrocarbon group containing 2-18 carbon atoms, a cycloaliphatic hydrocarbon group containing 5-10 carbon atoms, an araliphatic hydrocarbon group containing 8-13 carbon atoms, or an aromatic hydrocarbon group containing 6-15 carbon atoms.

Additional examples of polyisocyanates include, but are not limited to, ethylene diisocyanate; 1,4-tetramethylene diisocyanate; 1,6-hexamethylene diisocyanate; 1,12-dodecane diisocyanate; cyclobutane-1,3-diiso cyanate; cyclohexane-1,3- and -1,4-diisocyanate, and mixtures of these isomers; isophorone diisocyanate; 2,4- and 2,6-hexahydrotoluene diisocyanate and mixtures of these isomers; dicyclohexylmethane-4,4'-diisocyanate (hydrogenated MDI, or HMDI); 1,3- and 1,4-phenylene diisocyanate; 2,4- and 2,6-toluene diisocyanate and mixtures of these isomers (TDI); diphenylmethane-2,4'- and/or -4,4'-diisocyanate (MDI); naphthylene-1,5-diisocyanate; triphenylmethane-4,4',4"-triisocyanate; polyphenyl-polymethylene-polyisocyanates of the type which may be obtained by condensing aniline with formaldehyde, followed by phosgenation (crude MDI); norbornane diisocyanates; m- and p-isocyanatophenyl sulfonylisocyanates; perchlorinated aryl polyisocyanates; modified polyisocyanates containing carbodiimide groups, urethane groups, allophnate groups, isocyanurate groups, urea groups, or biruret groups; polyisocyanates obtained by telomerization reactions; polyisocyanates containing ester groups; and polyisocyanates containing polymeric fatty acid groups. Those skilled in the art will recognize that it is also possible to use mixtures of the polyisocyanates described above.

The polyol premix and at least one isocyanate may be contacted by mixing a stream of the at least one isocyanate (A side) and a stream of the polyol premix (B side). The mixing can be carried out by in a spray apparatus, a mixhead with or without a static mixer for combining the polyol component and blowing agent, or a vessel, and then spraying or otherwise depositing the reacting mixture onto a substrate. This substrate may be, for example, a rigid or flexible facing sheet made of foil or another material, including another layer of similar or dissimilar polyurethane which is conveyed, continuously or discontinuously, along a production line, or directly onto a conveyor belt.

Alternatively, the at least one isocyanate and the polyol premix may be contacted by being mixed and poured into an open mold or distributed via laydown equipment into an open mold or simply deposited at or into a location for which it is desired, i.e., a pour-in-place application, such as between the interior and exterior walls of a structure. In the case of deposition on a facing sheet, a second sheet may be applied on top of the deposited mixture. In other embodiments, the polyol premix and at least one isocyanate may be mixed and injected into a closed mold, with or without vacuum assistance for cavity-filling. If a mold is employed, it is most typically heated.

In general, such applications may be accomplished using the known one-shot, prepolymer or semi-prepolymer techniques used together with conventional mixing methods. The mixture, on reacting, takes the shape of the mold or adheres to the substrate to produce a polyurethane polymer or a more-or-less predefined structure, which is then allowed to cure in place or in the mold, either partially or fully. Optimum cure conditions will depend upon the particular components, including catalysts and quantities used in preparing the polymer and also the size and shape of the article manufactured.

The result may be a rigid foam in the form of slabstock, a molding, a filled cavity, including but not limited to a pipe or insulated wall or hull structure, a sprayed foam, a frothed foam, or a continuously- or discontinuously-manufactured laminate product, including but not limited to a laminate or laminated product formed with other materials such as hardboard, plasterboard, plastics, paper, metal, or a combination thereof.

Examples

Examples are provided below. However, the present disclosure is to be understood to not be limited in its application to the specific experiments, results, and laboratory procedures disclosed herein below. Rather, the Examples are simply provided as one of various embodiments and are meant to be exemplary and not exhaustive.

From the above description, it is clear that the present disclosure is well adapted to carry out the object and to attain the advantages mentioned herein as well as those inherent in the present disclosure. While exemplary embodiments of the present disclosure have been described for the purposes of the disclosure, it will be understood that numerous changes may be made which will readily suggest themselves to those skilled in the art which can be accomplished without departing from the scope of the present disclosure and the appended claims.

Stability Analysis

The following samples in Table 1 were prepared by hand mixing the listed ingredients at ambient conditions for about 1 minute.

TABLE 1

| Sample # | JEFFCAT® DMCHA catalyst[1] (g) | JEFFCAT® DMDEE catalyst[2] (g) | Ethylene Glycol (g) | Methyldiethanol amine (g) | Triethanol amine (g) | Solstice® 1233zd blowing agent[3] (g) |
|---|---|---|---|---|---|---|
| 1 | 10.2 | 3 | 1.8 | — | — | 15 |
| 2 (Comp.) | 10.2 | 3 | — | — | 1.8 | 15 |
| 3 (Comp.) | 10.2 | 4.8 | — | — | — | 15 |
| 4 (Comp.) | 4.8 | 10.2 | — | — | — | 15 |
| 5 (Comp.) | 10.2 | — | 4.8 | — | — | 15 |
| 6 (Comp.) | 10.2 | — | — | — | 4.8 | 15 |
| 7 | 10.2 | 3 | — | 1.8 | — | 15 |
| 8 (Comp.) | 15 | — | — | — | — | 15 |

[1]JEFFCAT® DMCHA catalyst is N,N-dimethylcyclohexylamine, used to produce rigid foams and is available from Huntsman Petrochemical LLC or an Affiliate thereof (The Woodlands, TX).
[2]JEFFCAT® DMDEE catalyst is 2,2'-dimorpholinodiethylether and is available from Huntsman Petrochemical LLC or an Affiliate thereof (The Woodlands, TX).
[3]Solstice® 1233zd blowing agent is a blowing agent from Honeywell International Inc. (Morristown, NJ).

The samples in Table 1 were evaluated for their physical appearance after 14 days of aging at ambient conditions, which is set forth in Table 2.

TABLE 2

| Sample # | Barely Any Change in Appearance, Color, Clarity | Lots of Fine White Solid on Walls or Precipitates | Homogeneously Hazy Liquid | Only One Small Participate Formed |
|---|---|---|---|---|
| 1 | X | | | |
| 2 | | X | | |
| 3 | | X | | |
| 4 | | | X | |
| 5 | X | | | |
| 6 | | | | X |
| 7 | X | | | |
| 8 | | | X | |

As demonstrated by Table 2, it is apparent that not all polyols are able to stabilize the combination of JEFFCAT® DMDEE and JEFFCAT® DMCHA in the presence of a hydrohaloolefin such as Solstice® 1233zd. It was unexpectedly found that both ethylene glycol and methyldiethanol amine are able to have good stability with the combination of JEFFCAT® DMDEE and JEFFCAT® DMCHA in the presence of Solstice® 1233zd blowing agent, but other polyols like, for example, triethanol amine had relatively poor stability with both JEFFCAT® DMDEE and JEFFCAT® DMCHA in the presence of the Solstice® 1233zd blowing agent.

Catalytic Reactivity and Stability

Catalyst systems A-D were prepared by hand mixing various amounts of JEFFCAT® DMCHA catalyst, JEFFCAT® DMDEE catalyst, and ethylene glycol together at ambient conditions.

Catalyst System A:

20 g of JEFFCAT® DMCHA catalyst, 20 g of JEFFCAT® DMDEE catalyst, and 10 g of ethylene glycol were mixed together to form Catalyst System A.

Catalyst System B:

23 g of JEFFCAT® DMCHA catalyst, 23 g of JEFFCAT® DMDEE catalyst, and 6 g of ethylene glycol were mixed together to form Catalyst System B.

Catalyst System C:

10 g of JEFFCAT® DMCHA catalyst, 34 g of JEFFCAT® DMDEE catalyst, and 6 g of ethylene glycol were mixed together to form Catalyst System C.

Catalyst System D:

34 g of JEFFCAT® DMCHA catalyst, 10 g of JEFFCAT® DMDEE catalyst, and 6 g of ethylene glycol were mixed together to form Catalyst System D.

Foams were then produced by hand mixing 1.6 g of each of Catalysts Systems A-D in cups with 50 g of a polyol blend defined in Table 3 to form Polyol Premixes of Catalyst Systems A-D.

TABLE 3

| Polyol Blend | |
| --- | --- |
| INGREDIENT | WT % |
| Terol® 649 polyol | 59.12 |
| JEFFOL® R425X polyol | 14.78 |
| PHT4-diol™ LV diol | 4 |
| Tris(1-chloro-2-propyl) phosphate ("TCPP") | 4 |
| Hydrohaloolefin stable silicone surfactant | 1 |
| Water | 1.7 |
| Solstice® 1233zd blowing agent | 11 |

(4) Terol® 649 polyol: a high aromatic, high functionality polyester polyol available from Huntsman Petrochemical LLC or an Affiliate thereof (The Woodlands, TX).
(5) JEFFOL® R-425X polyol: a low viscosity, high functionality, general purpose mannich based aromatic amine polyol available from Huntsman Petrochemical LLC or an Affiliate thereof (The Woodlands, TX).
(6) PHT4-diol™ LV diol: a tetrabromophthalate diol that acts as a flame retardant in rigid polyurethane foams, available from Chemtura Corp. (Philadelphia, PA).
(7) Tris(1-chloro-2-propyl) phosphate is a phosphorous flame retardant.

The polyol premixes were then each mixed with 50 g of RUBINATE® M isocyanate (available from Huntsman International LLC or an Affiliate thereof) for 3 seconds. Cream time, top of cup time, string gel time, tack free time, and end of rise time were determined after mixing. The results are provided in Table 4.

TABLE 4

| Sample | Cream Time (seconds) | Top of Cup Time (seconds) | String Gel Time (seconds) | Tack Free Time (seconds) | End of Rise Time (seconds) |
| --- | --- | --- | --- | --- | --- |
| Polyol Premix of Catalyst System A and isocyanate | 6 | 13 | 21 | 26 | 39 |
| Polyol Premix of Catalyst System B and isocyanate | 6 | 13 | 20 | 25 | 37 |
| Polyol Premix of Catalyst System C and isocyanate | 7 | 18 | 31 | 43 | 59 |
| Polyol Premix of Catalyst System D and isocyanate | 5 | 9 | 14 | 18 | 28 |

As can be seen in Table 4, it was found that specific ratios of JEFFCAT® DMCHA catalyst and JEFFCAT® DMDEE catalyst have significantly better results than others.

It was also discovered that certain ratios unexpectedly have improved front-end reactivity over the current art while maintaining a stability comparative with the current art, which is demonstrated in Tables 5-8 below.

In particular, Catalyst Systems B and D were compared with a comparative catalyst BDO3 as well as two industry leading polyurethane foam catalysts: (i) a tetramethyl guanidine-containing catalyst available from Evonik Industries AG (Essen, Germany) as Polycat® 204, and (ii) JEFFCAT® H-1 amine catalyst available from Huntsman Petrochemical LLC or an Affiliate thereof (The Woodlands, Tex.).

JEFFCAT® H-1 amine catalyst is a mixture of 1,2-dimethylimidazole, 2,2'-dimorpholinyldiethyl ether, and ethylene glycol. BDO3 catalyst is a urethane catalyst mostly comprising 1,4-di-(1-pyrrolidinyl)butane.

Polyol premixes were formed by individually mixing 14.1 g of each of Catalyst System B, Catalyst System D, the tetramethyl guanidine-containing catalyst, JEFFCAT® H-1 amine catalyst, and BDO3 catalyst with 307.2 g of the polyol blend set forth in Table 3.

The polyol premixes were assessed at four conditions: i) after 4 days at ambient conditions; ii) after thermal aging at 55° C. for two weeks; iii) after thermal aging at 40° C. for four weeks; and iv) after thermal aging at 55° C. for four weeks. The polyol premixes were assessed by determining the cream time, top of cup time, string gel time, tack free time, and end of rise time after individually mixing the unconditioned and thermally aged polyol premixes with RUBINATE® M isocyanate in cups for 3 seconds.

The following amounts of each polyol premix were mixed with the isocyanate as described above: 45.81 g of the JEFFCAT® H-1 amine catalyst polyol premix was mixed with 54.20 g of the RUBINATE® M isocyanate; 41.74 g of the tetramethyl guanidine-containing catalyst polyol premix was mixed with 58.22 g of the RUBINATE® M isocyanate; 48.39 of the Catalyst System B polyol premix was mixed with 51.61 g of the RUBINATE® M isocyanate; 45.82 g of the Catalyst System D polyol premix was mixed with 54.19 of the RUBINATE® M isocyanate; and 45.82 of the BDO3 catalyst polyol premix was mixed with 54.81 of the RUBINATE® M isocyanate, and then the cream time, top of cup time, string gel time, tack free time, and end of rise time were determined for such.

The examples were analyzed for their front-end reactivity at ambient conditions and also for their catalytic stability. Traditionally, catalytic stability is ascertained by determining the degree of change in cream time, top of cup time, gel time (i.e., the reactivity drift of the front-end reactivity) when a polyol premix is subjected to thermal aging and then reacted with an isocyanate. The less the reactivity drift for cream time and top of cup time, the more stable the composition.

Table 5 corresponds to the polyol mixtures held at ambient conditions for 4 days before mixing with the RUBINATE® M isocyanate.

TABLE 5

| Sample | Cream Time (seconds) | Top of Cup Time (seconds) | String Gel Time (seconds) | Tack Free Time (seconds) | End of Rise Time (seconds) |
|---|---|---|---|---|---|
| JEFFCAT ® H-1 amine catalyst polyol premix and isocyanate | 7 | 15 | 18 | 21 | 31 |
| Tetramethyl guanidine-containing catalyst polyol premix and isocyante | 8 | 20 | 24 | 31 | 44 |
| Catalyst System B polyol premix and isocyanate | 6 | 10 | 13 | 15 | 21 |
| Catalyst System D polyol premix and isocyanate | 5 | 8 | 10 | 12 | 26 |
| BDO3 catalyst polyol premix and isocyanate | 5 | 8 | 10 | 12 | 26 |

As can be seen in Table 5, the front-end reactivity of the mixtures containing the presently disclosed catalyst systems (i.e., Catalysts Systems B and D) held at ambient conditions is similar to that of the BDO3 catalyst and significantly improved over the mixtures containing JEFFCAT® H-1 amine catalyst and the tetramethyl guanidine-containing catalyst.

Table 6 corresponds to the polyol premixes that were thermally aged at 55° C. for 2 weeks before mixing with the RUBINATE® M isocyanate.

TABLE 6

| Sample | Cream Time (seconds) | Top of Cup Time (seconds) | String Gel Time (seconds) | Tack Free Time (seconds) | End of Rise Time (seconds) |
|---|---|---|---|---|---|
| JEFFCAT ® H-1 amine catalyst polyol premix and isocyanate | 7 | 15 | 18 | 21 | 29 |
| Tetramethyl guanidine-containing catalyst polyol premix and isocyante | — | 26 | 30 | 41 | 53 |
| Catalyst System B polyol premix and isocyanate | 7 | 15 | 19 | 26 | 34 |
| Catalyst System D polyol premix and isocyanate | 7 | 12 | 15 | 18 | 27 |
| BDO3 catalyst polyol premix and isocyanate | 9 | 17 | 20 | 23 | 32 |

As can be seen in Table 6, the reactivity of the mixtures containing Catalyst Systems B and D had comparable reactivity with the JEFFCAT® H-1 amine catalyst after thermal aging at 55° C. for 2 weeks, suggesting that the presently disclosed catalyst systems have good stability, and actually have improved stability over the BDO3 catalyst and significantly improved stability over the tetramethyl guanidine-containing catalyst.

Table 7 corresponds to the polyol premixes that were thermally aged at 40° C. for 4 weeks before mixing with the RUBINATE® M isocyanate.

TABLE 7

| Sample | Cream Time (seconds) | Top of Cup Time (seconds) | String Gel Time (seconds) | Tack Free Time (seconds) | End of Rise Time (seconds) |
|---|---|---|---|---|---|
| JEFFCAT ® H-1 amine catalyst polyol premix and isocyanate | 8 | 15 | 18 | 22 | 32 |
| Tetramethyl guanidine-containing catalyst polyol premix and isocyante | 9 | 28 | 32 | 50 | 66 |
| Catalyst System B polyol premix and isocyanate | 8 | 17 | 23 | 30 | 41 |
| Catalyst System D polyol premix and isocyanate | 8 | 15 | 18 | 28 | 30 |
| BDO3 catalyst polyol premix and isocyanate | 10 | 19 | 22 | 29 | 39 |

As can be seen in Table 7, the reactivity of the mixtures containing Catalyst Systems B and D was comparable with the JEFFCAT® H-1 amine catalyst and BDO3 catalyst after thermal aging at 40° C. for 4 weeks, suggesting that the presently disclosed catalyst systems have good stability, and actually have significantly improved stability over the tetramethyl guanidine-containing catalyst.

Table 8 corresponds to the polyol premixes that were thermally aged at 55° C. for 4 weeks mixtures before mixing with the RUBINATE® M isocyanate.

TABLE 8

| Sample | Cream Time (seconds) | Top of Cup Time (seconds) | String Gel Time (seconds) | Tack Free Time (seconds) | End of Rise Time (seconds) |
|---|---|---|---|---|---|
| JEFFCAT ® H-1 amine catalyst polyol premix and isocyanate | 8 | 15 | 18 | 21 | 31 |
| Tetramethyl guanidine-containing catalyst polyol premix and isocyante | 8 | 34 | 41 | 55 | 77 |
| Catalyst System B polyol premix and isocyanate | 12 | 25 | 28 | 33 | 46 |
| Catalyst System D polyol premix and isocyanate | 11 | 21 | 25 | 33 | 41 |
| BDO3 catalyst polyol premix and isocyanate | 13 | 29 | 33 | 42 | 52 |

Although the reactivity of the mixtures containing Catalyst Systems B and D was a little less than the JEFFCAT® H-1 amine catalyst after being thermally conditioned at the harsher conditions of 55° C. for 4 weeks, the reactivity of Catalyst Systems B and D was still comparable to the JEFFCAT® H-1 amine catalyst and, in fact, was still better than the BDO3 catalyst and the tetramethyl guanidine-containing catalyst, thereby suggesting that the stability of the presently disclosed catalyst systems is comparable, and in some cases better than, the industry standard catalysts.

Additional examples were prepared in order to compare the use of (i) a catalyst system comprising JEFFCAT® DMCHA catalyst, JEFFCAT® DMDEE catalyst, and methyldiethanolamine (MDEA) and (ii) a catalyst system comprising JEFFCAT® DMCHA catalyst, JEFFCAT® DMDEE catalyst, and ethylene glycol.

In particular, the following polyol premixes in Table 9 were prepared by hand mixing the listed ingredients for each sample at ambient conditions for 30 seconds.

TABLE 9

| Sample # | Polyol Blend[9] (g) | JEFFCAT ® H-1 amine catalyst (g) | MDEA[10] (g) | EG[11] (g) | JEFFCAT ® DMDLC[12] (g) | Catalyst Mixture and EG[13] | Catalyst Mixture and MDEA[14] |
|---|---|---|---|---|---|---|---|
| 9 | 43.86 | 0.99 | — | — | — | — | — |
| 10 | 43.86 | — | 1.13 | — | — | — | — |
| 11 | 43.86 | — | — | 1.17 | — | — | — |
| 12 | 43.86 | — | — | — | 1.11 | — | — |
| 13 | 43.86 | — | — | — | — | 0.98 | — |
| 14 | 43.86 | — | — | — | — | — | 0.97 |

[9]The polyol blend is the polyol blend specified in Table 3.
[10]MDEA is methyldiethanolamine.
[11]EG is ethylene glycol.
[12]JEFFCAT ® DMDLC is a low color version of JEFFCAT ® DMDEE available form Huntsman Petrochemical LLC or an Affiliate thereof (The Woodlands, TX).
[13]Catalyst Mixture and EG is a mixture of 68% JEFFCAT ® DMCHA, 20% JEFFCAT ® DMDEE, and 12% EG (ethylene glycol) that had been stored at ambient conditions for 10 days.
[14]Catalyst Mixture and MDEA is a mixture of 68% JEFFCAT ® DMCHA, 20% JEFFCAT ® DMDEE, and 12% MDEA (methyldiethanolamine) that had been stored at ambient conditions for 10 days.

The samples of Table 9 were then individually mixed with 54.18 g of RUBINATE® M isocyanate in cups for 5 seconds, and the cream time, top of cup time, string gel time, tack free time, and end of rise time were determined for such and are presented in Table 10.

TABLE 10

| Sample # | Cream Time (seconds) | Top of Cup Time (seconds) | String Gel Time (seconds) | Tack Free Time (seconds) | End of Rise Time (seconds) |
|---|---|---|---|---|---|
| 9 (Comp.) | 15 | 29 | 36 | 42 | 51 |
| 10 (Comp.) | 28 | 59 | 82 | 134 | 141 |
| 11 (Comp.) | 70 | 165 | 209 | 491 | <491 |
| 12 (Comp.) | 9 | 44 | 79 | 111 | 117 |
| 13 | 10 | 17 | 20 | 28 | 33 |
| 14 | 10 | 16 | 19 | 25 | 30 |

As demonstrated by Table 10, the experimental catalyst system comprising JEFFCAT® DMCHA, JEFFCAT® DMDEE, and MDEA (Sample No. 14) showed comparable results to the experimental catalyst system comprising JEFFCAT® DMCHA, JEFFCAT® DMDEE, and ethylene glycol (Sample No. 13), and both showed significantly improved front-end reactivity over the JEFFCAT® H-1 amine catalyst.

Additional examples were prepared to demonstrate the effect of catalyst systems comprising (i) JEFFCAT® DMDEE and JEFFCAT® DPA, and (ii) JEFFCAT® DMDEE, JEFFCAT® DPA, and JEFFCAT® DMCHA as compared to a catalyst system comprising just JEFFCAT® DPA.

In particular, a solubility analysis of JEFFCAT® DMDEE, JEFFCAT® DPA, and JEFFCAT® DMCHA, alone or in various combinations, was carried out to determine the stability of such catalysts in combination with each other and with a hydrofluoroolefin blowing agent. Amounts of each component (as set forth in Table 11) were added at room temperature and then vigorously mixed by hand for about 2 minutes and allowed to settle. The visual observations of the stability test are set forth in Table 11 below.

TABLE 11

| Sample # | JEFFCAT® DPA (g) | JEFFCAT® DMDEE (g) | JEFFCAT® DMCHA (g) | Solstice® 1233zd blowing agent (g) | Observation |
|---|---|---|---|---|---|
| 15 | 16 | — | — | 4 | Clear, soluble |
| 16 | 10 | — | — | 10 | Clear, soluble |
| 17 | 4 | — | — | 16 | Some solids |
| 18 | 10 | 10 | — | — | Clear, soluble |
| 19 | 2 | 8 | — | 10 | Clear but has some gelatin on top |
| 20 | 4 | 6 | — | 10 | Clear but has some gelatin on top |
| 21 | 6 | 4 | — | 10 | Clear, soluble |
| 22 | 8 | 2 | — | 10 | Clear, soluble |
| 23 | — | 10 | — | 10 | Clear, soluble |
| 24 | — | 10 | 10 | — | Clear, soluble |
| 25 | 10 | — | 10 | — | Clear, soluble |
| 26 | 7 | 7 | 6 | — | Clear, soluble |
| 27 | 4 | 4 | 2 | 10 | Clear, soluble |
| 28 | 4 | 2 | 4 | 10 | Slightly hazy with a few solids at bottom |
| 29 | 2 | 4 | 4 | 10 | Slightly hazy with some gelatin/solids on sides |
| 30 | 6 | 2 | 2 | 10 | Clear with a little gelatin on sides |
| 31 | 2 | 6 | 2 | 10 | Clear with a few solids on sides |
| 32 | 2 | 2 | 6 | 10 | Slightly hazy with some solids at bottom |
| 33 | — | — | 10 | 10 | Clear, soluble |

As shown above, JEFFCAT® DPA alone has some solubility issues in the presence of the Solstice® 1233zd blowing agent especially at low concentrations where it formed precipitates. However, in combination with JEFFCAT® DMDEE or JEFFCAT® DMCHA, the JEFFCAT® DPA behaved better, especially at higher concentrations. Regardless of concentrations, a combination of JEFFCAT® DMDEE, JEFFCAT® DMCHA and JEFFCAT® DPA are sufficiently stable in the presence of a blowing agent like Solstice® 1233zd blowing agent.

Polyol premixes were then prepared using such catalysts as set forth in Table 12 below. The amount for each ingredient for the samples is set forth as a weight percentage in Table 12 with samples 38-41 being comparative samples containing JEFFCAT® DPA catalyst without JEFFCAT® DMDEE catalyst or JEFFCAT® DMCHA catalyst.

TABLE 12

| | Polyol Premixes | | | | | | | |
|---|---|---|---|---|---|---|---|---|
| | SAMPLE | | | | | | | |
| INGREDIENT | 34 | 35 | 36 | 37 | 38 | 39 | 40 | 41 |
| Terol® 649 polyol | 59.12 | 59.12 | 57.52 | 57.52 | 57.52 | 55.52 | 60.52 | 59.02 |
| JEFFOL® R425X polyol | 14.78 | 14.78 | 14.78 | 14.78 | 14.78 | 14.78 | 14.78 | 14.78 |
| PHT4-diol™ LV diol | 4 | 4 | 4 | 4 | 4 | 4 | 4 | 4 |
| Tris(1-chloro-2-propyl) phosphate ("TCPP") | 4 | 4 | 4 | 4 | 4 | 4 | 4 | 4 |
| Hydrohaloolefin stable silicone surfactant | 1 | 1 | 1 | 1 | 1 | 1 | 1 | 1 |
| Water | 1.7 | 1.7 | 1.7 | 1.7 | 1.7 | 1.7 | 1.7 | 1.7 |
| JEFFCAT® DMDEE | 3 | 2.5 | 3 | 2.5 | — | — | — | — |
| JEFFCAT® DPA | 1.4 | 1.4 | 3 | 3 | 6 | 8 | 3 | 4.5 |
| JEFFCAT® DMCHA | — | 0.5 | — | 0.5 | — | — | — | — |
| Solstice® 1233zd blowing agent | 11 | 11 | 11 | 11 | 11 | 11 | 11 | 11 |
| Total Wt % | 100 | 100 | 100 | 100 | 100 | 100 | 100 | 100 |

50 g of each of the polyol premixes of samples 34-41 were mixed with 50 g of RUBINATE® M isocyanate (available from Huntsman International LLC or an Affiliate thereof) for 3 seconds. Cream time, top of cup time, string gel time, tack free time, and end of rise time were determined upon mixing.

Additionally, some of the poly premixes of samples 34-37 were aged at ambient temperature for 2 weeks or at 50° C. for 2 weeks and then 50 g of such samples were mixed with 50 g of RUBINATE® M isocyanate for 3 seconds. Cream time, top of cup time, string gel time, tack free time, and end of rise time were determined upon mixing.

The results are provided in Table 13 for the systems containing aged and un-aged polyol premixes.

TABLE 13

| Sample # | Cream Time (s) | Top of Cup Time (s) | String Gel Time (s) | Tack Free Time (s) | End of Rise Time (s) |
|---|---|---|---|---|---|
| 34 | 6 | 25 | 35 | 41 | 53 |
| 35 | 8 | 16 | 23 | 26 | 36 |
| 36 | 6 | 11 | 17 | 23 | 32 |
| 37 | 6 | 12 | 16 | 19 | 23 |
| 38 | 10 | 13 | 15 | 18 | 28 |
| 39 | 7 | 9 | 11 | 13 | 20 |
| 40 | 13 | 21 | 25 | 29 | 38 |
| 41 | 10 | 15 | 18 | 20 | 29 |
| 34 Aged 2 weeks @ 50° C. | 9 | 29 | 43 | 52 | 64 |
| 35 Aged 2 weeks @ 50° C. | 10 | 24 | 32 | 37 | 49 |
| 36 Aged 2 weeks @ ambient temp | 8 | 16 | 23 | 27 | 37 |
| 37 Aged 2 weeks @ ambient temp | 8 | 14 | 18 | 21 | 29 |

As can be seen in Table 13, the cream time for the samples containing JEFFCAT® DMDEE and/or JEFFCAT® DMCHA in combination with JEFFCAT® DPA has unexpectedly improved cream times over JEFFCAT® DPA used alone and were even better or at least similar after being aged. As would be understood by a person of ordinary skill in the art, even 1 second—not to mentioned on average 3 seconds—of improved cream time is significant in the industry when applying spray polyurethane foam. Such an increase in cream time reduces the instances or degree of unwanted dripping of sprayed polyurethane foam.

From the above description, it is clear that the present disclosure is well adapted to carry out the object and to attain the advantages mentioned herein as well as those inherent in the present disclosure. While exemplary embodiments of the present disclosure have been described for the purposes of the disclosure, it will be understood that numerous changes may be made which will readily suggest themselves to those skilled in the art which can be accomplished without departing from the scope of the present disclosure and the appended claims.

What is claimed is:

1. A polyol premix, comprising:
   at least one hydrohaloolefin blowing agent;
   a polyol; and
   a catalyst system comprising 2,2'-dimorpholinodiethyl ether, N-(3-dimethylaminopropyl)-N,N-diisopropanolamine, and N,N-dimethylcyclohexylamine, wherein the weight ratio of 2,2'-dimorpholinodiethyl ether to N-(3-dimethylaminopropyl)-N,N-diisopropanolamine to N,N-dimethylcyclohexylamine is about 5:6:1.

2. The polyol premix of claim 1, wherein the at least one hydrohaloolefin blowing agent is selected from trans-1-chloro-,3,3,3-tetrafluoropropene (HFCO 1233zd), trans-1,3,3,3-tetrafluoropropene (HFO 1234ze), and a combination thereof.

3. The polyol premix of claim 1, wherein the catalyst system is present in the polyol premix in an amount ranging from 0.1 to 15 wt % based on the weight of the polyol premix.

4. The polyol premix of claim 1, wherein the catalyst system further comprises a hydroxyl-containing compound selected from a diol, an alkanolamine, and a combination thereof.

5. The polyol premix of claim 1, wherein the premix is substantially free of a metal catalyst, an imidazole or imidazole derivative, and/or tetra guanidines and derivatives thereof.

6. A method of forming a polyurethane or polyisocyanurate foam, comprising contacting the polyol premix of claim 1 with at least one isocyanate.

7. A foam obtained by the method of claim 6.

8. A method of forming a polyol premix, comprising combining:
   at least one hydrohaloolefin blowing agent;
   a polyol; and
   a catalyst system comprising 2,2'-dimorpholinodiethyl ether, N-(3-dimethylaminopropyl)-N,N-diisopropanolamine, and N,N-dimethylcyclohexylamine,
   wherein the weight ratio of 2,2'-dimorpholinodiethyl ether to N-(3-dimethylaminopropyl)-N,N-diisopropanolamine to N,N-dimethylcyclohexylamine is about 5:6:1.

9. A polyurethane formulation, comprising:
   at least one hydrohaloolefin blowing agent;
   a polyol;
   a catalyst system comprising 2,2'-dimorpholinodiethyl ether, N-(3-dimethylaminopropyl)-N,N-diisopropanolamine, and N,N-dimethylcyclohexylamine, wherein the weight ratio of 2,2'-dimorpholinodiethyl ether to N-(3-dimethylaminopropyl)-N,N-diisopropanolamine to N,N-dimethylcyclohexylamine is about 5:6:1; and
   at least one isocyanate.

* * * * *